United States Patent
Amirapu

(10) Patent No.: US 9,865,101 B2
(45) Date of Patent: Jan. 9, 2018

(54) METHODS FOR DETECTING ONE OR MORE AIRCRAFT ANOMALIES AND DEVICES THEREOF

(71) Applicant: Wipro Limited, Bangalore (IN)

(72) Inventor: Raja Sekhar Amirapu, Hyderabad (IN)

(73) Assignee: Wipro Limited, Bangalore (IN)

( * ) Notice: Subject to any disclaimer, the term of this patent is extended or adjusted under 35 U.S.C. 154(b) by 140 days.

(21) Appl. No.: 14/981,334

(22) Filed: Dec. 28, 2015

(65) Prior Publication Data

US 2017/0124782 A1 May 4, 2017

(30) Foreign Application Priority Data

Oct. 30, 2015 (IN) .......................... 5864/CHE/2015

(51) Int. Cl.
*G07C 5/08* (2006.01)
*G06F 17/30* (2006.01)
*B64D 45/00* (2006.01)

(52) U.S. Cl.
CPC ..... *G07C 5/0808* (2013.01); *G06F 17/30241* (2013.01); *G06F 17/30545* (2013.01); *G06F 17/30598* (2013.01); *B64D 2045/0085* (2013.01)

(58) Field of Classification Search
CPC ............ G07C 5/0808; G06F 17/30241; G06F 17/30545; G06F 17/30598; B64D 2045/0085

See application file for complete search history.

(56) References Cited

U.S. PATENT DOCUMENTS

| | | | |
|---|---|---|---|
| 9,070,285 B1 * | 6/2015 | Ramu ................... | G05D 1/0044 |
| 2005/0232512 A1 * | 10/2005 | Luk ....................... | G06K 9/6293 |
| | | | 382/276 |
| 2008/0243383 A1 * | 10/2008 | Lin ....................... | G01C 21/165 |
| | | | 701/469 |
| 2009/0216393 A1 * | 8/2009 | Schimert ............ | G05B 23/0251 |
| | | | 701/14 |
| 2014/0149806 A1 | 5/2014 | Khalastchi et al. | |

* cited by examiner

*Primary Examiner* — Russell Frejd
(74) *Attorney, Agent, or Firm* — LeClairRyan, a Professional Corporation

(57) ABSTRACT

Methods, devices, and non-transitory computer readable media that detect an anomaly in an aircraft include obtaining aircraft flight data from multiple aircraft sensor devices. The obtained aircraft flight data is clustered into two or more data groups. A distance between the clustered aircraft flight data in at least one of the two or more data groups associated with a part of the aircraft and stored baseline flight data for the part of the aircraft is determined. A statistical model analysis is executed on the determined distance to detect any anomaly with the part of the aircraft.

15 Claims, 6 Drawing Sheets

METHODS FOR DETECTING ONE OR MORE AIRCRAFT ANOMALIES AND DEVICES THEREOF

This application claims the benefit of Indian Patent Application Serial No. 5864/CHE/2015 filed Oct. 30, 2015, which is hereby incorporated by reference in its entirety.

FIELD

This technology generally relates to methods and devices for detecting anomalies and, more particularly, to methods for detecting one or more aircraft anomalies and devices thereof.

BACKGROUND

Typically, an average commercial aircraft generates a massive amount of data in each flight. Each part of an aircraft may be fitted with different sensor devices which are capable of monitoring one or more key operating characteristics, such as temperatures, pressures, speeds, flows and/or vibration levels at various places in the aircraft. Data from the aircraft may also be captured to provide context for monitoring systems, including altitude, speed, air temperature, cabin air quantity, and electrical power.

This massive amount of flight data is also known as big data which is a phrase used for sets of data so large or complex that traditional data processing applications are inadequate. Existing challenges with big data include problems rooted in computer technology with analysis, capture, data curation, search, sharing, storage, transfer, visualization, and information privacy.

Because of these existing computer technology complexities of how to effectively analyze this massive amount of aircraft data, prior computer analytic systems for detecting any issues with aircraft primarily have been focused on analyzing smaller directed subsets of this captured flight data. Unfortunately, by initially focusing on smaller subsets of data, rather than the massive set of captured flight data, the resulting analyses have been less accurate and effective in identifying aircraft anomalies.

SUMMARY

A method for detecting an anomaly in an aircraft includes obtaining, by a big data analytic computing device, aircraft flight data acquired by multiple aircraft sensor devices. The obtained aircraft flight data is clustered, by the big data analytic computing device, into two or more data groups. A distance between the clustered aircraft flight data in one of the two or more groups associated with a part of the aircraft and stored baseline flight data for the part of the aircraft is determined, by the big data analytic computing device. A statistical model analysis is executed, by the big data analytic computing device, on the determined distance to detect any anomaly with the part of the aircraft.

A big data analytic computing device with a memory coupled to one or more processors which are configured to be capable of executing programmed instructions stored in the memory to obtain aircraft flight data acquired by multiple aircraft sensor devices. The obtained aircraft flight data may be clustered into two or more data groups. A distance between the clustered aircraft flight data in one of the two or more groups associated with a part of the aircraft and stored baseline flight data for the part of the aircraft is determined. A statistical model analysis is executed on the determined distance to detect any anomaly with the part of the aircraft.

This technology provides a number of advantages including providing methods and devices that effectively analyze big flight data to detect any aircraft anomaly. By effectively implementing big data analytics in accordance with this technology, long standing issues rooted in computer technology have been solved that increase operational efficiency and facilitate preventive maintenance of faulty and soon-to-fail parts of an aircraft. Additionally, with this technology focused graphical user interface displays which highlight the detected aircraft anomalies are provided and/or targeted communications with one or more recommendations for corrective actions are electronically transmitted.

DETAILED DESCRIPTION

Figure 1:
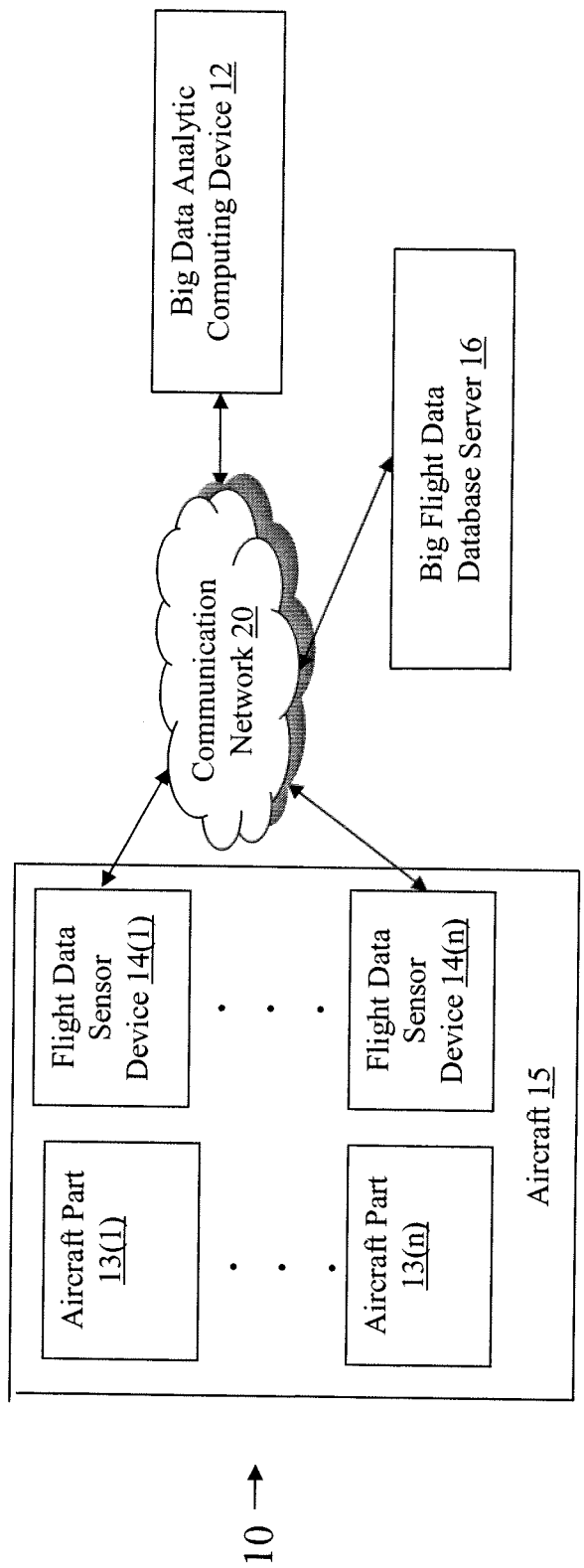
FIG. 1 is a diagram of an example of an environment with an example of a big data analytic computing device that detects any anomaly in an aircraft.
Figure 2:
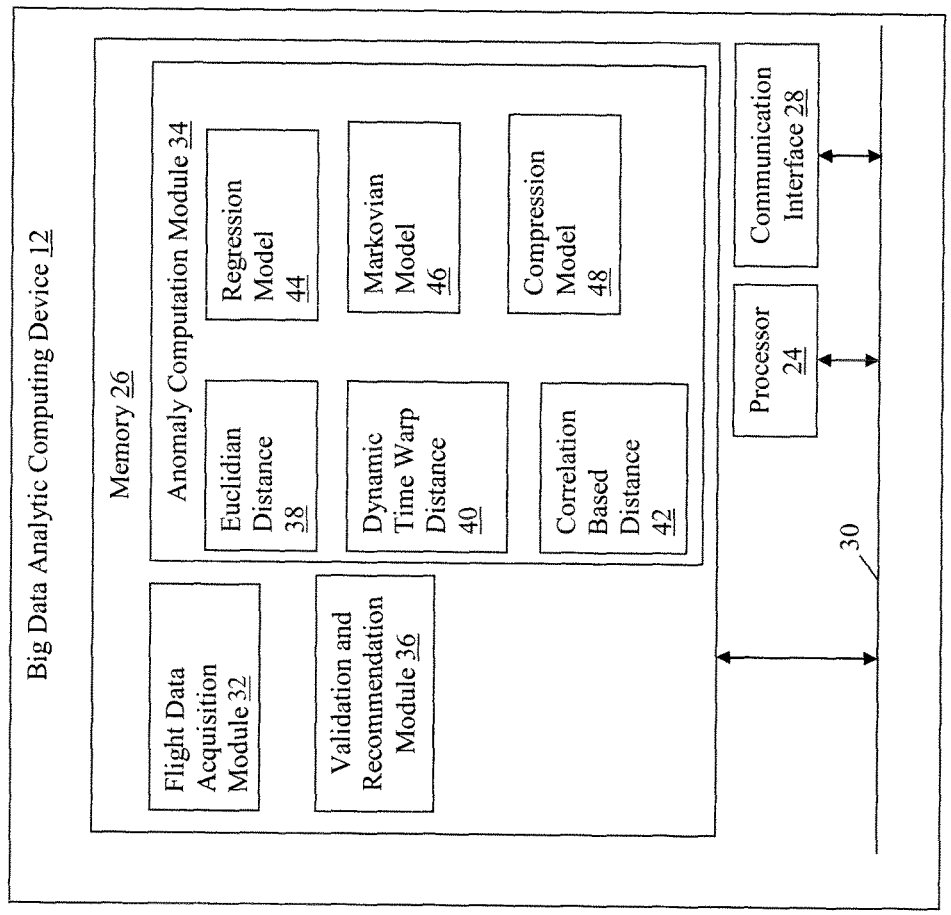
FIG. 2 is a block diagram of the example of the big data analytic computing device shown in FIG. 1.
Figure 3:
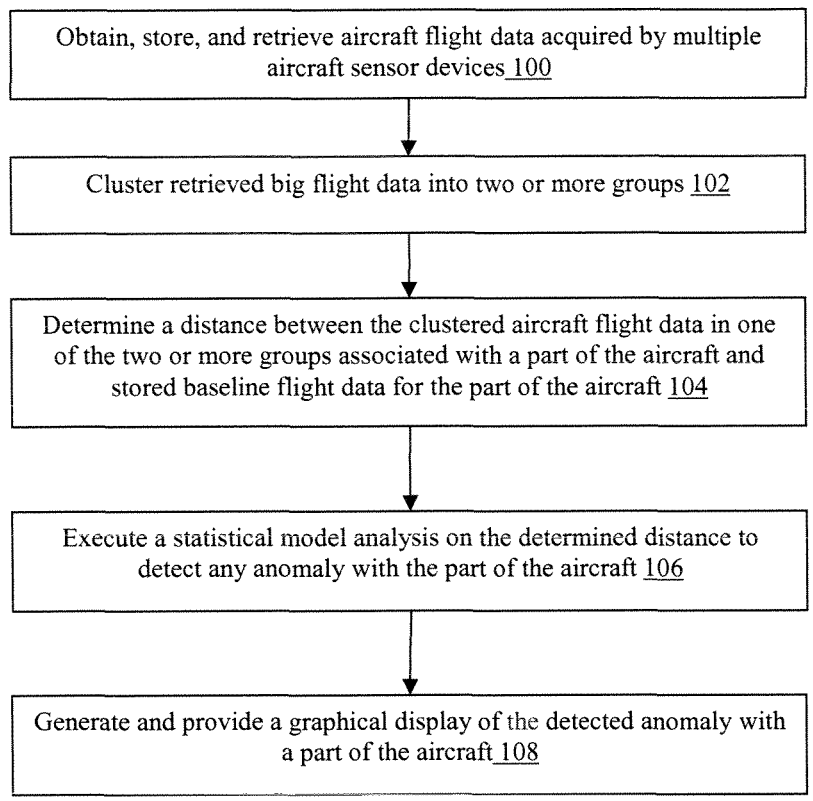
FIG. 3 is a flowchart of an example of a method for detecting an anomaly in an aircraft.
Figure 4:
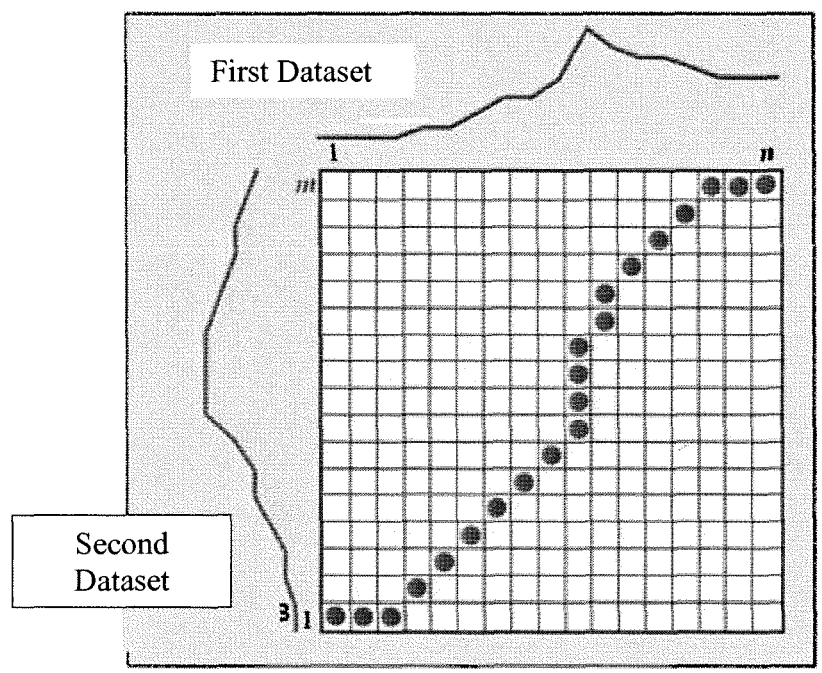
FIG. 4 is a graph of showing a typical data plot using dynamic time warping distance for detecting anomaly.
Figure 5:
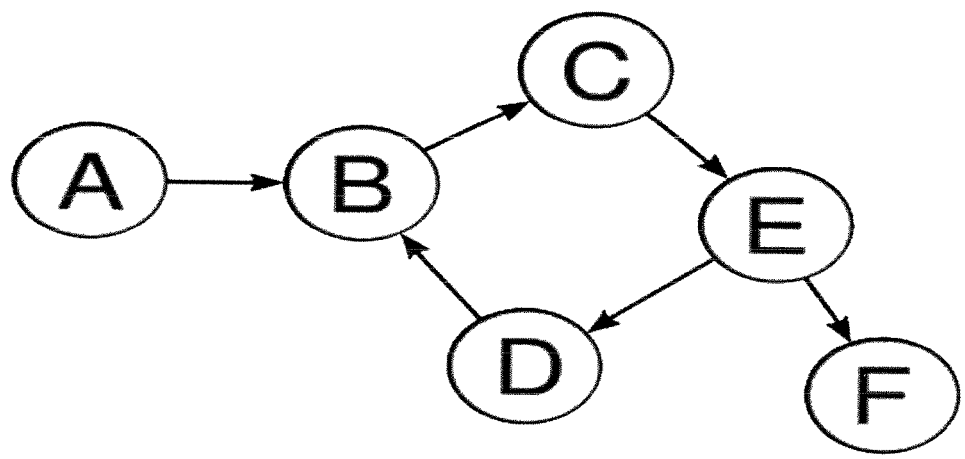
FIG. 5 is a diagram of an example of a data plot using Markovian model for detecting an anomaly.

An environment 10 with exemplary big data analytic computing device 12 is illustrated in FIGS. 1-2. In this particular example, the environment 10 includes the big data analytic computing device 12, aircraft parts 13(1)-13(n) and flight data sensor devices 14(1)-14(n) in an aircraft 15, and a big flight data database server 16 coupled via a communication network 20, although the environment could include other types and numbers of systems, devices, components, and/or other elements in other configurations. This technology provides a number of advantages including providing methods, devices, and non-transitory computer readable media that effectively analyze big flight data to detect any aircraft anomaly.

Referring more specifically to FIGS. 1-2, the big data analytic computing device 12 may include a processor 24, a memory 26, and a communication interface 28 which are coupled together by a bus 30, although the big data analytic computing device 12 may include other types and/or numbers of physical and/or virtual systems, devices, components, and/or other elements in other configurations.

The processor 24 of the big data analytic computing device 12 may execute one or more programmed instructions stored in the memory 26 for detecting an anomaly in an aircraft as illustrated and described in the examples herein, although other types and/or numbers of instructions can be performed. The processor 24 of the big data analytic computing device 12 may include one or more central processing units and/or general purpose processors with one or more processing cores, for example.

The memory 26 of the big data analytic computing device 12 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a, hard disk, CD ROM, DVD ROM, or other computer readable medium which is read from and written to by a magnetic, optical, or other reading and writing system that is coupled to the processor 24, can be used for the memory 26. In this particular example, the memory 26 includes a flight data acquisition module 32, a validation and recommendation module 34, and an anomaly computation module 34, although the memory 26 can comprise other types and/or numbers of other modules, programmed instructions and/or other data. The instructions, steps, and/or data of the flight data acquisition module 32, the validation and recommendation module 34, and the anomaly computation module 34 are illustrated and described by way of the examples herein.

The flight data acquisition module 32 may comprise executable programmed instructions which are configured to be capable of managing sampling of flight data from one or more of the flight data sensors 14(1)-14(n). Additionally, the flight data acquisition module 32 may comprise executable programmed instructions which are configured to be capable of storing and later retrieval of the flight data from the big flight data database server 16, although the flight data may be obtained from other sources and may be stored and retrieved in other manners.

The anomaly computation module 34 may comprise executable programmed instructions which are configured to be capable of processing the acquired big flight data to detect any anomaly. In particular, the anomaly computation module 34 may comprise executable programmed instructions which are configured to be capable of clustering the big flight data into groups. Additionally, the anomaly computation module 34 may comprise executable programmed instructions which are configured to be capable of determining distance with one or more sub-modules such as a Euclidean distance sub-module 38, a dynamic time warping distance sub-module 40, and/or a correlation-based distance sub-module 42, although other approaches for distance determination can be used. Further, the anomaly computation module 34 may be configured to execute a statistical model analysis on the determined distance to detect any anomaly with one of the aircraft parts 13(1)-13(n) in the aircraft 15 which may utilize one or more of a regression model sub-module 44, a Markovian model sub-module 46, and/or a compression model sub-module 48 to assist with the analysis to detect an anomaly in a part of the aircraft, although other types and/or numbers of modules, sub-modules and/or other programmed instructions could be executed.

The validation and recommendation module 36 may comprise executable programmed instructions which are configured to be capable of generating and providing graphical user interfaces or other types and/or numbers of displays or other outputs of the big flight data and/or any detected anomalies. Additionally, the validation and recommendation module 36 may further comprise executable programmed instructions which are configured to be capable of generating and providing electronic transmissions of one or more recommendations for repairing or replacing one or more parts 13(1)-13(n) of the aircraft 15 based on any detected anomalies. By way of example only, the data on the recommendations may be stored in memory 26 and correlated based on the detected anomaly for providing one or more recommendations for use in repairing or replacing one or more of the aircraft parts 13(1)-13(n) of the aircraft 15.

The communication interface 28 of the big data analytic computing device 12 operatively couples and communicates between one or more of flight data sensor devices 14(1)-14(n) in the aircraft 15 and/or the big flight data database server 16, although other types and/or numbers of communication networks or systems with other types and/or numbers of connections and configurations to other devices and elements. By way of example only, the communication networks 20 can use TCP/IP over Ethernet and industry-standard protocols, including NFS, CIFS, SOAP, XML, LDAP, SCSI, and SNMP, although other types and numbers of communication networks, can be used. The communication networks 20 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the flight data sensors 14(1)-14(n) is coupled to or positioned adjacent to one of the aircraft parts 13(1)-13(n) of the aircraft 15 to acquire big flight data, although flight data sensors 14(1)-14(n) may obtain flight data from other sources in other manners. Each of the flight data sensor devices 14(1)-14(n) may include a processor, a memory, and a communication interface, which are coupled together by a bus or other link, although each could have other types and/or numbers of elements.

The big flight data database server 16 may include a processor, a memory, and a communication interface, which are coupled together by a bus or other link, although the big flight data database server 16 may have other types and/or numbers of other elements. Additionally, in this particular example the big flight data database server 16 may store and provide big flight data for processing to detect anomalies, although other types and/or amounts of data may be stored and/or the data may be stored in other locations, such as in memory 26 in the big data analytic computing device 12.

Although the exemplary network environment 10 with the big data analytic computing device 12, the aircraft parts 13(1)-13(n) and flight data sensor devices 14(1)-14(n) in the aircraft 15, the big flight data database server 16 and the communication networks 20 are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for detecting an anomaly in an aircraft will now be described with reference to FIGS. 1-6. In step 100, the flight data acquisition module 32 may be executed so that big aircraft flight data related to one or more of the aircraft parts 13(1)-13(n) may be obtained by one or more of the aircraft sensor devices 14(1)-14(n) in the aircraft 15 and stored by the big data analytic computing device 12 in the big flight data database server 16, although the big aircraft flight data could be obtained from other sources and/or stored in other locations. By way of example only, the big flight data that is acquired may include information, such as sensor recordings, sampling rates, units of measurement (UOM), and/or other parameters, although other types and/or or amounts of flight data may be acquired and stored for use. The parameters collected from the flight data sensor devices 14(1)-14(n) may for example include flight data on engine vibration, tank quantity, oil temperature, core speed of engines, engine cycle, engine hours, and/or any engine fire date, although other types and/or amounts of flight data could be acquired. The flight data may be stored by the big data analytic computing device 12 as a data structure which contains an identification of any corresponding stored parameters along with a description of those parameters, although other types and/or amounts of other information may be stored. The big data analytic computing device 12 may then retrieve stored big flight data from the big flight data database server 16 to begin the process for detecting any anomalies with aircraft parts 13(1)-13(n) of aircraft 15 in this example.

In step 102, the big data analytic computing device 12 may execute the anomaly computation module 34 to cluster the obtained big flight data into two or more groups. The anomaly computation module 34 may be executed by the big data analytic computing device 12 to group the acquired big flight data based on one or more parameters by creating a resilient distributed dataset (RDD). An RDD is a distributed memory abstraction that allows in-memory computations to be performed on large clusters in a fault-tolerant manner. RDDs are motivated by two types of applications that current computing frameworks handle inefficiently: iterative algorithms; and interactive data mining tools. In both cases, keeping data in memory can improve performance by an order of magnitude. To achieve fault tolerance efficiently, RDDs provide a restricted form of shared memory based on coarse-grained transformations rather than fine-grained updates to shared state. However, RDDs are expressive enough to capture a wide class of computations, including recent specialized programming models for iterative jobs, such as Pregel and new applications that these models do not capture.

In step 104, the anomaly computation module 36 may also be executed by the big data analytic computing device 12 to determine a distance between the clustered aircraft flight data in one of the two or more groups associated with a part of the aircraft 15 and stored baseline flight data in memory 26 for the one or more aircraft parts 13(1)-13(n) of the aircraft 15 as illustrated and described by way of the examples below.

The Euclidian distance sub-module 38 may be executed by the big data analytic computing device 12 to compute the "Euclidean distance" which measures the similarity between two datasets e.g. the grouped big flight data and the corresponding stored baseline data in memory 26, to determine the distance.

$$d(p, q) = \sqrt{(p_1 - q_1)^2 + (p_2 - q_2)^2 + \ldots + (p_n - q_n)^2} = \sqrt{\sum_{i=1}^{n} (p_i - q_i)^2}$$

By way of example only, the two datasets applied here are the first dataset (p1) which is flight data and second dataset (q1) which is that of successful flight. Euclidean distance is a simple way to determine similarity between two data objects. To do this, the data objects have numerical attributes which need to be normalized. As shown in the above formula, each attribute in one data object is subtracted from the other corresponding attribute and is then added in quadrature. The result of executing the Euclidian distance sub-module 38 is the determination of the "distance" between the two data objects, e.g. the acquired and grouped flight data and the baseline data for the corresponding one of the aircraft parts 13(1)-13(n) of the aircraft 15.

The dynamic time warp (DTW) distance sub-module 40 may be executed by the big data analytic computing device 12 to compute the DTW distance between the grouped big flight data and the corresponding stored baseline data in memory 26 in this example. In this example, big data analytic computing device 12 applies DTW logic to the existing datasets which are read from the flight data sensor devices 14(1)-14(n) against the successful stored baseline flight data to identify any gaps. The two sequences are "warped" non-linearly in the time dimension by the big data analytic computing device 12 to determine a measure of their similarity independent of certain non-linear variations in the time dimension. This sequence alignment method is often used in time series classification. Inside each cell a distance measure can be placed by comparing the corresponding elements of the two sequences. To find the best match or alignment between these two sequences one needs to find a path through the grid which minimizes the total distance between them. The procedure for computing this overall distance involves finding all possible routes through the grid and for each one computation of the overall distance is done. The overall distance is the minimum of the sum of the distances between the individual elements on the path divided by the sum of the weighting function. The weighting function is used to normalize for the path length. It is apparent that for any considerably long sequences the number of possible paths through the grid will be very large. An example is illustrated in the graph shown in FIG. 4.

The correlation-based distance sub-module 42 may be executed by the big data analytic computing device 12 to compute a correlation-based distance for detecting anomaly. In statistics and in probability theory, distance correlation is a measure of statistical dependence between two random variables or two random vectors of arbitrary, not necessarily equal dimension. An important property is that this measure of dependence is zero, if and only if, the random variables are statistically independent. This measure is derived from a number of other quantities that are used in its specification, specifically: distance variance; distance standard deviation; and distance covariance. These take the same roles as the ordinary moments with corresponding names in the specification of the Pearson product-moment correlation coefficient. Although examples of determining a Euclidian distance, a DTW distance and a correlation based distance between each group of the big flight data and the corresponding baseline data for one or more of the aircraft parts 13(1)-13(n), other types and/or numbers and/or other combinations of distance determinations could be used.

The correlation based distance sub-module in the bid data analytic computing device 12 may include Pearson correlation module which measures the similarity in shape between two profiles. The formula for the Pearson Correlation distance is:

$$d=1-r$$

Where r is: $r=Z(x) \cdot Z(y)/n$

In step 106, the anomaly computation module 36 may be executed by the big data analytic computing device 12 to conduct a statistical model analysis on each of the determined distances to detect any anomaly with any of the aircraft parts 13(1)-13(n) of the aircraft 15.

By way of example, the regression model sub-module 42 may be executed by the big data analytic computing device 12 to detect any anomaly with any of the aircraft parts 13(1)-13(n) of the aircraft 15 based on the determined distances. In statistics, simple linear regression is the least squares estimator of a linear regression model with a single explanatory variable. In other words, simple linear regression fits a straight line through the set of n points in such a way that makes the sum of squared residuals of the model (that is, vertical distances between the points of the data set and the fitted line) as small as possible. The adjective simple refers to the fact that this regression is one of the simplest in statistics. The slope of the fitted line is equal to the correlation between y and x corrected by the ratio of standard deviations of these variables. The intercept of the fitted line is such that it passes through the center of mass (x, y) of the data points. All parameters which are mentioned in the parameters section of the grouped big flight data are calculated. In this example, one of the groups of big flight data comprise our current data and the baseline data of the successful flight dataset and the big data analytic computing device plots these sets of data in a regression graph.

$$\text{Regression Equation}(y)=a+bx$$

$$\text{Slope } (b)=(N\Sigma XY-(\Sigma X)(\Sigma Y))/(N\Sigma X^2-(\Sigma X)^2)$$

$$\text{Intercept } (a)=(\Sigma Y-b(\Sigma X))/N$$

Where:
X and y are the variables;
b=the slope of the regression line;
a=the intercept point of the regression line and the y axis;
N=Number of values or elements;
X=Values from the first dataset;
Y=Values from the second dataset;
ΣXY=Sum of the product of first and Second Scores;
ΣX=Sum of First Scores;
ρY=Sum of Second Scores; and
ΣX²=Sum of square First dataset values.

This model analysis will predict what values are going to occur in the future. Multi linear regression is also the same process as described above.

$$Y=\alpha+\beta_1 x_1+\beta_2 r_2+\ldots+\beta_k x_k$$

Where:
Y is the predicted value of the dependent variable; and
α is a constant term (the 'intercept', the value of Y when all the Ps are zero), estimating the true value, alpha in the population.

The Markovian model sub-module 46 may be executed by the big data analytic computing device 12 to assist with the analysis to detect any anomaly with any of the aircraft parts 13(1)-13(n) of the aircraft 15 based on the determined distances. A Markov process is a stochastic process (random process) in which the probability distribution of the current state is conditionally independent of the path of past states, a characteristic called the Markov property. This model will predict the next value of each and every parameter which comes in the future based on the values and based on which relevant and necessary action could be taken.

$$Pr(X_{n+1}=x|X_1=z_1, X_2=z_2, \ldots, X_n=x_n)=Pr(X_{n+1}=x|X_n=x_n),$$

As set forth in the above formula, this model analysis will predict the next values based on the failure states of the aircraft parts 13(1)-13(n) for which the big flight data is emitted. In the other words, this model will predict the probability of the corresponding aircraft parts 13(1)-13(n) failing. These Markov chains are described as directed graphs.

Figure 6:
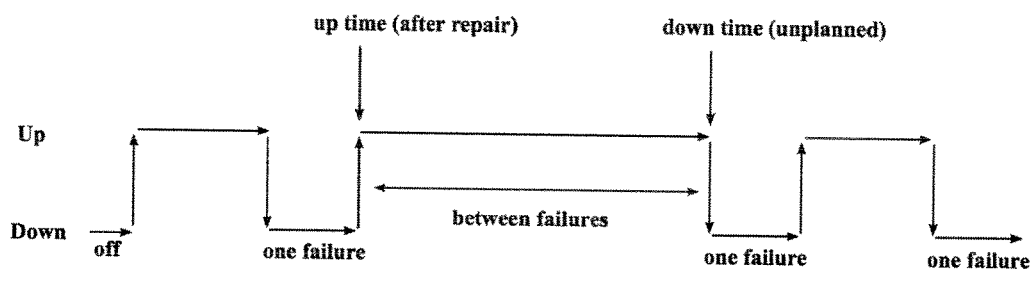
FIG. 6 is a diagram of an example of time between failure for a part of an aircraft.

As shown in FIG. 6, each state describes the state of the value and its transition, where the edges of graph n are labeled by the probabilities of going from one state at time n to the other states at time n+1, $$Pr(X_{n+1}=x|X_n,x_n).$$

The same information is represented by the transition matrix from time n to time n+1. However, Markov chains are frequently assumed to be time-homogeneous, in which case the graph and matrix are independent of n and so are not presented as sequences. In other words the future state depends upon the past state. The probability of going from state i to state j in n time steps is $$p_{ij}^{(n)}=Pr(X_n=j|X_0=i)$$

And the single-step transition is:

$$p_{ij}=Pr(X_1=J|X_0=i).$$

For a time-homogeneous Markov chain:

$$p_{ij}^{(n)}=Pr(X_{k+n}=j|X_k=i)$$

And $$p_{ij}Pr(X_{k+1}=j|X_k=i).$$

The n-step transition probabilities satisfy the Chapman-Kolmogorov equation, that for any k such that 0<k<n, $$p_{ij}^{(n)} = \sum_{r \in S} p_{ir}^{(k)} p_{rj}^{(n-k)}$$

The compression model sub-module 46 may also be executed by the big data analytic computing device 12 to assist with the analysis to detect any anomaly with any of the aircraft parts 13(1)-13(n) of the aircraft 15 based on the determined distances. As described earlier, different types of data, such as double values, integer values, float values etc, related to one or more of the aircraft parts 13(1)-13(n) may be obtained by one or more of the aircraft sensor devices 14(1)-14(n).

To derive a common. If p is a floating point 64-bit number, Int(p) is defined as an integer that is represented by the same 64-bit string as p, see the table below, a hexadecimal notation can be used for such numbers to emphasize the byte-level representation. byte number 12345678 a1 2.3667176745585676 Int(a1) 40 02 ef 09 ad 18 c0 f6 a2 2.3667276745585676 Int(a2) 40 02 ef 0e eb 46 23 2f a3 2.3667376745585676 Int(a3) 40 02 ef 14 29 73 85 6a. In this table, three real numbers a1, a2, a3 differ in the 5-th digit after the decimal point only. It is a linear growing sequence. Each number occupies 64 bits. The first three bytes are almost the same, and the general purpose algorithms for compression of byte sequences can use this fact for compression. However, the problem is that five last bytes are perceived as completely random. There is no correlation between these five bytes of one number and five bytes of another number. Traditional compression algorithms cannot compress these.

|  |  |  | byte number | | | | | | | |
| --- | --- | --- | --- | --- | --- | --- | --- | --- | --- | --- |
|  |  |  | 1 | 2 | 3 | 4 | 5 | 6 | 7 | 8 |
| $a_1$ | 2.3667176745585676 | Int($a_1$) | 40 | 02 | ef | 09 | ad | 18 | c0 | f6 |
| $a_2$ | 2.3667276745585676 | Int($a_2$) | 40 | 02 | ef | 0e | eb | 46 | 23 | 2f |
| $a_3$ | 2.3667376745585676 | Int($a_3$) | 40 | 02 | ef | 14 | 29 | 73 | 85 | 6a |

Assume an array b containing 64-bit integers $b_i$, $i=1,\ldots n$ is given. The first difference is defined as $\Delta 1 b_i = b_i - b_{i-1}$. The m-th difference is defined in a similar way as $\Delta m b_i = \Delta m-1 b_i - \Delta m-1 b_{i-1}$. Instead of storing the whole array b we can just store the m-th differences for b. In this case we need storage for n values: (b1, b2, ..., bm, $\Delta m b_{i+1}$, $\Delta m b_{i+2}$, ..., $\Delta m b_n$). The values which are grouped by RDD compressed and are sent as a message for processing.

Once the message is received the data is decompressed in the following way. The original sequence a can be unambiguously restored from the compressed sequence: First, sequence of integers c is restored from the bit string e. Then first m values are copied: $a_j = Real(c_j)$ for $j=1,\ldots,m$. After that from every $c_j$ where $j=m+1, \ldots, n$ the value $a_j$ is sequentially computed as follows: After that from every $c_j$ where $j=m+1, n$ the value $a_j$ is sequentially computed as follows: 1. The m extrapolation points to the left of j are chosen: $x_1 = j-m, \ldots, x_m = j-1$. 2. Correspondingly, function values are set as $f_1 = a_{j-m}, \ldots, f_m = a_{j-1}$. 3. The predicted value m(x) for x=j is computed using the Lagrange formula. 4. The actual value is computed as sum of predicted value and the residual: $a_j = Real(Int(m(j)) + c_j)$ Evaluation of m(j) includes double precision arithmetic's that potentially can give different results on different processors, since they use different technique to round up multiplication or division result to fit it into 64-bit space.

Although examples of conducting a Markovian model, regression model and compression model analysis on each of the determined distances to detect any anomaly with any of the aircraft parts 13(1)-13(n) of the aircraft 15 have been illustrated and described herein, other types and/or numbers and/or other combinations of statistical model analyses could be used on the big flight data to detect any anomalies.

In step 108, the validation and recommendation module may be executed by the big data analytic computing device 12 to validate, generate and provide the data in the form of graphs and/or recommendations retrieved from memory 26 based on the detected anomaly. The provided graphs and/or recommendations will provide data on and/or directions on how to address the detected anomaly or anomalies in the corresponding ones of the aircraft parts 13(1)-13(n) in the aircraft. The graphs generated and presented by the big data analytic computing device 12 may be specific to the obtained big flight data plotted for distance based and model based approaches. The graphs generated and presented by the big data analytic computing device 12 may also be created to enable a drill down deeper and deeper into more detail on the detected anomaly in the generated and provided graphs. For example, if you have a flight with airspeed at 250 Knots and an altitude at 10,000 ft there is nothing abnormal about this, but if the airspeed is 250 Knots at 1000 ft then that is computationally significant because there is not enough time for that aircraft to bleed off this airspeed before landing without having to go-around or do some sort of unusual maneuver. This anomaly can detected and would be illustrated in the generated graphs by the big data analytic computing device 12.

The big data analytic computing device 12 may also be adapted to compute one or more of the Mean Time Between Failure (MTBF), Mean Time between critical failure (MTBCF) and/or Mean Time To Repair (MTTR), although other types and/or numbers of other failure related indicators could be calculated and provided. The MTBF is the communitive sum of (start of down time—start of up time)/no of failures. The historical MTBF is plotted and shown to clearly identify when MTBF is growing or coming down. The mean time between critical failure of mission-essential functions may be calculated by the big data analytic computing device 12 as the ratio of active hours (those excluding scheduled maintenance) and the number of critical failures. The Mean Time to Repair (MTTR) may be the calculated big data analytic computing device 12 as total amount of time spent performing all the corrective maintenance repairs divided by the total number of those repairs.

Accordingly, as illustrated and described by way of reference to the examples herein, this technology provides methods, devices, and non-transitory computer readable media that effectively analyze big flight data to detect any aircraft anomaly. By effectively using big data analytics, this technology is able to increase operational efficiency and facilitate preventive maintenance of faulty and soon-to-fail parts of an aircraft. Additionally, with this technology, the detected anomalies may be presented in generated graphs and/or may transmit recommendations for corrective actions.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for detecting an anomaly in an aircraft, the method comprising:

obtaining, by a big data analytic computing device, aircraft flight data from multiple aircraft sensor devices;

clustering, by the big data analytic computing device, the obtained aircraft flight data into two or more data groups;

computing, by the big data analytic computing device, a distance between the clustered aircraft flight data in at least one of the two or more data groups associated with a part of the aircraft and stored baseline flight data for the part of the aircraft, wherein the distance is at least one of a Euclidean distance or a dynamic time warping distance; and executing, by the big data analytic computing device, a statistical model analysis on the determined distance to detect an anomaly with the part of the aircraft.

2. The method as set forth in claim 1 wherein the clustering the obtained aircraft flight data further comprises grouping, by the big data analytic computing device, the obtained aircraft flight data into a resilient distributed dataset.

3. The method as set forth in claim 1 wherein the executing further comprises executing, by the big data analytic computing device, at least one of a regression model, a Markovian model, or a compression model on the determined distance to detect the anomaly with the part of the aircraft.

4. The method as set forth in claim 1 further comprising computing, by the big data analytic computing device, at least one of a mean time between failure, mean time between critical failure, or mean time to repair for the part of the aircraft based on the detected anomaly with the part of the aircraft.

5. The method as set forth in claim 1 further comprising generating and providing, by the big data analytic computing device, a graphical display of the detected anomaly with the part of the aircraft.

6. A big data analytic computing device, comprising:
one or more processors;
a memory coupled to the one or more processors which are configured to execute programmed instructions comprising and stored in the memory to:
obtain aircraft flight data from multiple aircraft sensor devices;
cluster the obtained aircraft flight data into two or more data groups;
compute a distance between the clustered aircraft flight data in at least one of the two or more data groups associated with a part of the aircraft and stored baseline flight data for the part of the aircraft, wherein the distance is at least one of a Euclidean distance or a dynamic time warping distance; and
execute a statistical model analysis on the determined distance to detect an anomaly with the part of the aircraft.

7. The device as set forth in claim 6 wherein the processors are further configured to execute one or more additional programmed instructions comprising and stored in the memory to group the obtained aircraft flight data into a resilient distributed dataset.

8. The device as set forth in claim 6 wherein the processors are further configured to execute one or more additional programmed instructions comprising and stored in the memory to execute at least one of a regression model, a Markovian model, or a compression model on the determined distance to detect the anomaly with the part of the aircraft.

9. The device as set forth in claim 6 wherein the processors are further configured to execute one or more additional programmed instructions comprising and stored in the memory to compute at least one of a mean time between failure, mean time between critical failure, or mean time to repair for the part of the aircraft based on the detected anomaly with the part of the aircraft.

10. The device as set forth in claim 6 wherein the processors are further configured to execute one or more additional programmed instructions comprising and stored in the memory to generate and provide a graphical display of the detected anomaly with the part of the aircraft.

11. A non-transitory computer readable medium comprising instructions stored thereon for improving product performance, which when executed by at least one processor, cause the processor to perform steps comprising:
obtaining aircraft flight data from multiple aircraft sensor devices;
clustering the obtained aircraft flight data into two or more data groups;
computing a distance between the clustered aircraft flight data in at least one of the two or more data groups associated with a part of the aircraft and stored baseline flight data for the part of the aircraft, wherein the distance is at least one of a Euclidean distance or a dynamic time warping distance; and
executing a statistical model analysis on the determined distance to detect an anomaly with the part of the aircraft.

12. The non-transitory computer readable medium as claimed in claim 11,
further comprising one or more additional programmed instructions, which when executed by the processor, further cause the processor to perform one or more additional steps comprising grouping the obtained aircraft flight data into a resilient distributed dataset.

13. The non-transitory computer readable medium as claimed in claim 11,
further comprising one or more additional programmed instructions, which when executed by the processor, further cause the processor to perform one or more additional steps comprising executing at least one of a regression model, a Markovian model, or a compression model on the determined distance to detect the anomaly with the part of the aircraft.

14. The non-transitory computer readable medium as claimed in claim 11,
further comprising one or more additional programmed instructions, which when executed by the processor, further cause the processor to perform one or more additional steps comprising computing at least one of a mean time between failure, mean time between critical failure, or mean time to repair for the part of the aircraft based on the detected anomaly with the part of the aircraft.

15. The non-transitory computer readable medium as claimed in claim 11, further comprising one or more additional programmed instructions, which when executed by the processor, further cause the processor to perform one or more additional steps comprising generating and providing a graphical display of the detected anomaly with the part of the aircraft.

* * * * *